(12) United States Patent
Ennis

(10) Patent No.: US 8,097,155 B2
(45) Date of Patent: Jan. 17, 2012

(54) ABOVE GROUND WATER CLARIFIER

(76) Inventor: G. Thomas Ennis, Inglewood, CA (US)

(*) Notice: Subject to any disclaimer, the term of this patent is extended or adjusted under 35 U.S.C. 154(b) by 294 days.

(21) Appl. No.: 12/584,335

(22) Filed: Sep. 3, 2009

(65) Prior Publication Data
US 2010/0326899 A1 Dec. 30, 2010

Related U.S. Application Data

(60) Provisional application No. 61/269,837, filed on Jun. 30, 2009.

(51) Int. Cl.
*B01D 36/04* (2006.01)

(52) U.S. Cl. ...... 210/232; 210/255; 210/257.1; 210/258; 210/259; 210/260; 210/262; 210/313; 210/317; 210/320; 210/335; 210/344; 210/416.1; 210/456; 210/496

(58) Field of Classification Search ......... 210/255, 210/257.1, 258, 259, 261, 262, 291, 299, 210/305, 312, 313, 316, 317, 320, 335, 344, 210/416.1, 456, 496, 232
See application file for complete search history.

(56) References Cited

U.S. PATENT DOCUMENTS

| | | | |
|---|---|---|---|
| 468,670 A * | 2/1892 | Mandigo | 210/307 |
| 1,902,171 A * | 3/1933 | Kopp | 210/301 |
| 3,398,673 A | 8/1968 | Koplock | |
| 3,450,266 A | 6/1969 | Allen | |
| 3,502,215 A | 3/1970 | Cahan | |
| 3,550,778 A | 12/1970 | Kesselman | |
| 3,616,917 A | 11/1971 | Hellwege | |
| 3,774,625 A | 11/1973 | Wiltrout | |
| 3,810,544 A | 5/1974 | Armstrong | |
| 3,836,001 A | 9/1974 | Heldreth | |
| 3,923,658 A | 12/1975 | Lancaster | |
| 4,104,164 A | 8/1978 | Chelton | |
| 4,107,044 A * | 8/1978 | Levendusky | 210/266 |
| 4,168,231 A | 9/1979 | Allen | |
| 4,362,628 A | 12/1982 | Kennedy | |
| 4,652,368 A | 3/1987 | Ennis | |
| 5,084,175 A * | 1/1992 | Hoffmeier | 210/344 |
| 5,409,603 A * | 4/1995 | Tsung | 210/233 |
| 5,445,730 A * | 8/1995 | Pattee | 210/167.31 |
| 5,788,849 A * | 8/1998 | Hutter et al. | 210/163 |
| 6,926,828 B2 * | 8/2005 | Shiraishi et al. | 210/310 |
| 2009/0114609 A1 * | 5/2009 | Miller | 210/799 |

* cited by examiner

*Primary Examiner* — Matthew Savage
(74) *Attorney, Agent, or Firm* — Risso & Associates; Marcus Risso

(57) ABSTRACT

An above ground water clarifier is described. The clarifier includes a spray system for receiving water from an external system and disposing the water onto a filter tray rack. A first recovery chamber is positioned below the filter tray rack for receiving filtered water that is gravity fed through the filter tray rack. A second recovery chamber is positioned adjacent to and fluidly connected with the first recovery chamber. The first and second recovery chambers are formed to filter out solids and/or oils before passing the water to a sump chamber and/or the sewer. The sump chamber includes a plurality of tiered pumps for pumping the water back to the external system.

14 Claims, 9 Drawing Sheets

ABOVE GROUND WATER CLARIFIER

PRIORITY CLAIM

The present application is a Non-Provisional Utility patent application of U.S. Provisional Application No. 61/269,837, filed on Jun. 30, 2009, entitled, "Above Ground Reclaim System."

BACKGROUND OF THE INVENTION (1) Field of Invention

The present invention relates to a water clarification system and, more particularly, to an above ground water clarifier for use with an external system for cleaning, storing, and recycling water from the external system.

(2) Description of Related Art

Water clarification and reclamation systems have long been known in the art. Such systems have been used in a variety of operations for capturing, cleaning and recycling the water used in the operations. By way of example, automatic vehicle-washing systems are well-known, and are in widespread use for washing passenger automobiles, trucks, buses, railroad equipment, and the like. A typical system includes a conveyor for moving the vehicle through the installation, and a series of power-driven brushes which are moved around the vehicle under a drenching spray of water and soap or detergent to remove dirt and grease. The washed vehicle is given a drenching spray of clean rinse water, and is then moved to a drying station.

Operating economy and the need for water conservation dictate recovery and reuse of the contaminated water collected in a floor trench beneath the vehicle path. Recovered water is usually quite dirty, and particulates and oily residues must be removed from the contaminated water before recycling through the system.

A typical filter system for vehicle wash water is shown in U.S. Pat. No. 4,104,164, and this system is useful in many such installations. This arrangement, and other commercially available filter systems, are not ideal, however, in that they all use a below-ground water clarifier. The below-ground water clarifier typically consists of a series of tanks that are stored below ground level. Such below-ground tanks include a manhole cover through which the sand trap and/or other components can be serviced. Because of the below-ground positioning, the tanks are difficult to access and cannot be serviced in their entirety (as they are encased in concrete or soil). Further, because they are often positioned at level with or below sewer access level, the below-ground water reclaim clarifier requires an electric pump to discharge any excess water to the sewer.

Another problem with known systems is that they use pump-driven filter systems which are also costly to maintain and service. The pump-driven filter systems require a considerable amount of energy to operate and include internal pump filters that are not easily accessible.

Thus, a continuing need exists for an above ground water clarifier that is easily serviceable, can gravity feed excess water to the sewer, and that includes an energy efficient gravity fed filter system.

SUMMARY OF INVENTION

The present invention is an above-ground water clarifier for use with an external system for filtering out solids and/or oil from water before release to a sewer system or return to the external system. The above ground water clarifier comprises an above ground tank with a plurality of distinct chambers for receiving water having measurable amounts of solids and/or oils. Each chamber has a top portion and a bottom portion and is fluidly connected with at least one other chamber via a conduit positioned between the top and bottom portions. The chambers are formed to settle solids at the bottom portions and oil at the top portions and thereby remove solids and/or oils from fluids passing between the chambers via the conduit. A gravity fed drain system is connected with the chambers to allow a user to selectively gravity feed water from at least one of the chambers to a sewer or other tank.

The plurality of distinct chambers includes a recovery chamber and a sump chamber. Additionally, the above ground water clarifier further comprises a spray system for receiving water from an external system and disposing the water onto a filter tray rack. A filter tray rack is included for filtering the water as it falls through the filter tray rack. The recovery chamber is positioned below the filter tray rack for receiving and collecting the water filtered by the filter tray rack. Further, the sump chamber is in fluid connection with the recovery chamber for receiving water from the recovery chamber and pumping the water to an above ground reclaim holding tank.

In another aspect, the filter tray rack includes a plurality of removable filter trays, each subsequent filter tray disposed directly beneath a preceding filter tray such that water dripping through the preceding filter tray drips into the subsequent filter tray for further filtering. Each filter tray includes a perforated mesh support and a removable foam filter supported thereon. The removable foam filter is operable for filtering out solids from the water. Additionally, each foam filter is of a distinct texture from one another to filter out solids of different sizes.

In yet another aspect, the spray system further includes at least two spray manifolds positioned above the filter trays and formed to spray the water onto the filter trays.

Additionally, a plurality of sump pumps is positioned within the sump chamber. Each sump pump is placed on a tiered stand at a different elevation within the sump chamber for pumping the water from the sump chamber to the reclaim holding tank.

In yet another aspect, the recovery chamber further comprises a first recovery chamber disposed directly beneath the filter tray rack for separating solids and/or oil from the water and a second recovery chamber separated from the first recovery chamber by a baffle and disposed adjacent to the first recovery chamber. The first recovery chamber is fluidly connected with the second recovery chamber via an inverted conduit having inlets that project downward and below a water surface level, thereby allowing water to pass between the first and second recovery chambers while minimizing the passage of oils therebetween. Additionally, the second recovery chamber is in fluid connection with the sump chamber via another inverted conduit.

A removable filter cleaning tray is positioned above the second recovery chamber at an angle such that water draining from the filter cleaning tray falls into the second recovery chamber. The removable filter cleaning tray is formed to accommodate a filter tray to allow a user to position and clean a filter tray thereon. Additionally, the removable filter cleaning tray is attached with the water clarifier such that removal of the removable filter cleaning tray exposes both the second recovery chamber and the sump chamber.

In another aspect, the drain system includes at least four inlets, a first inlet from a bottom portion of the first recovery chamber, a second inlet from a bottom portion of the second recovery chamber, a third inlet from a bottom portion of the sump chamber, and a fourth inlet from a top portion of the second recovery chamber to operate as an overflow drain that will allow excess water to gravity feed to a sewer or other tank.

In yet another aspect, an oil absorbing material can be dispersed in at least one of the sump chamber, the first recovery chamber, and the second recovery chamber to further remove any oil that may have traveled into the respective chamber.

Additionally, the present invention includes an above ground water reclaim holding tank for receiving the water from the sump chamber. Through the holding tank, the water can be gravity fed to the sewer or returned to the external system from which is was initially received.

Finally, as can be appreciated by one in the art, the present invention also comprises a method for forming and using the clarifier described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Description

Figure 1:
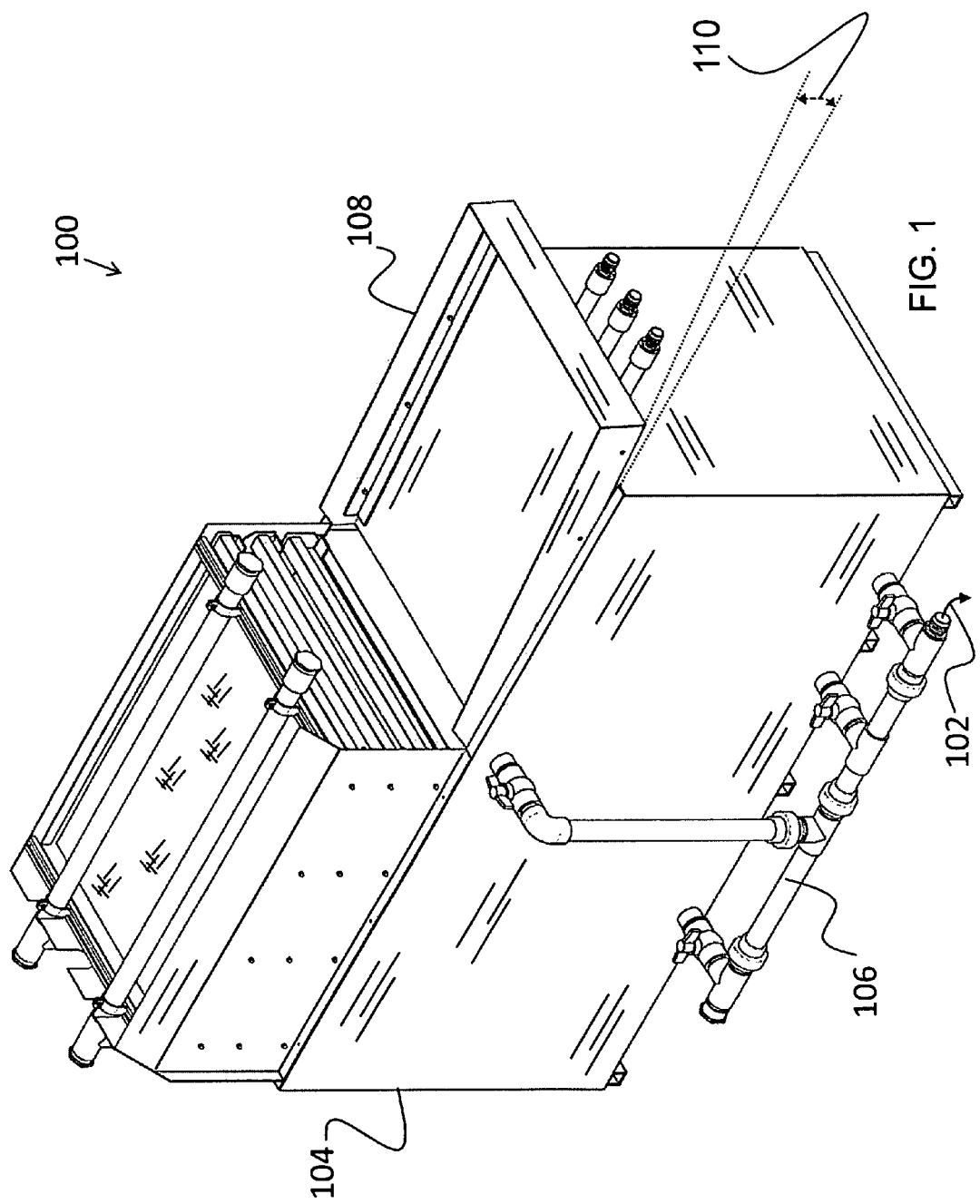
FIG. 1 is a perspective-view illustration of an above ground water clarifier according to the present invention.

As shown in FIG. 1, the present invention is an above ground water clarifier 100 for filtering out solids and/or oils from water reclaimed from an external system before release to a sewer system 102. The above ground water clarifier 100 of the present invention can be used with any external system that can utilize a water clarifier to remove contaminants from contaminated water. As a non-limiting example, the clarifier 100 of the present invention is operable for use with a vehicle washing system to remove particulates and oily residues from contaminated water before recycling through the system and/or release to a sewer.

Generally speaking, the clarifier 100 includes an above ground tank 104 with a plurality of distinct chambers separated by baffles and fluidly connected with one another (described in further detail below). The chambers are used to receive contaminated water (having measurable amounts of solids and/or oils) and allow the solids to settle at bottom portions of the chambers while oils settle at top portions of the chambers. The oil settles at the top portions of the chamber due to the properties of oil and its natural tendency to float on water.

The clarifier includes a gravity fed drain system 106 that is fluidly connected with the chambers (via piping, etc.) to allow a user to selectively gravity feed water from at least one of the chambers to a sewer 102 or other tank. In another aspect, although not illustrated, the drain system can be operated via a pump or series of pumps.

Figure 2:
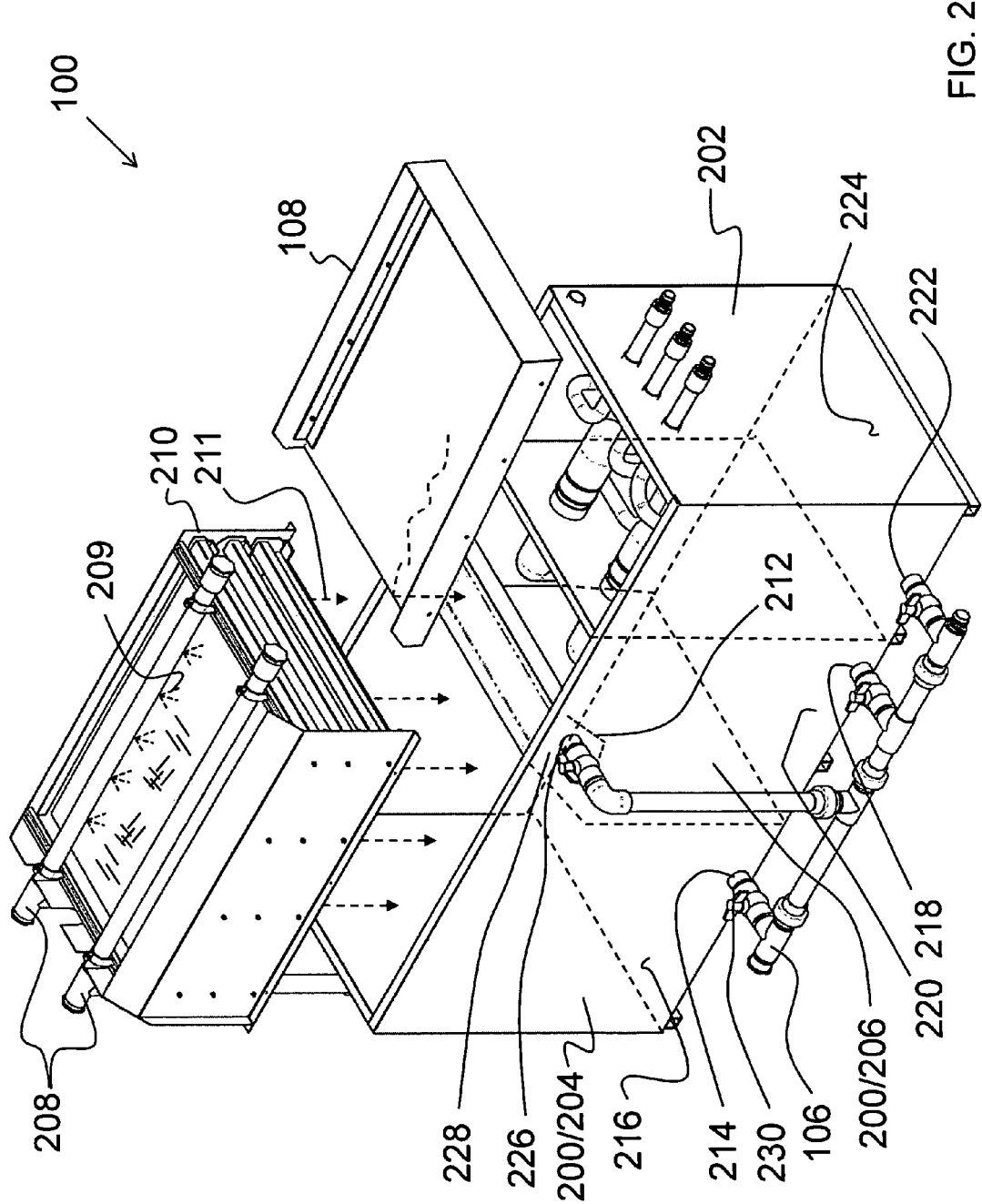
FIG. 2 is perspective-view illustration of the clarifier, illustrating a filter tray rack and a filter cleaning tray lifted as being from the clarifier to depict internal chambers therein.

As shown in FIG. 2, the plurality of distinct chambers includes a recovery chamber 200 and a sump chamber 202. The recovery chamber 200 can be further formed to include multiple sub-chambers, such as a first recovery chamber 204 and a second recovery chamber 206, with each subsequent recovery chamber being used to further remove solids and/or oils in the water as the water travels toward the sump chamber 202.

As noted above, the clarifier includes a drain system 106. The drain system 106 comprises any number of inlets and conduits to allow a user to drain all and/or portions of the clarifier 100. As a non-limiting example, the drain system 106 includes a plurality of inlets, such as a first inlet 214 at a bottom portion 216 of the first recovery chamber 204, a second inlet 218 at a bottom portion 220 of the second recovery chamber 206, and a third inlet 222 at a bottom portion 224 of the sump chamber 202. A fourth inlet 226 can be included at a top portion 228 of the second recovery chamber 206 to operate as an overflow drain that will allow excess water to gravity feed to a sewer or other tank. Each of the inlets can be separately fed to a sewer or other tank via a conduit (e.g., piping) or they can be fluidly connected with one another via such conduits. Further, the drain system 106 can be formed to include a plurality of stop mechanisms 230, with a stop mechanism 230 positioned within the conduit proximate each inlet. A non-limiting example of such a stop mechanism 230 is a stop-cock valve that allows a user to selectively open and close the fluid flow through the conduit proximate each inlet.

The clarifier 100 also includes a spray system 208. The spray system 208 is any suitable mechanism or device for receiving contaminated water 209 from the external system and disposing the contaminated water 209 into the clarifier 100. As a non-limiting example, the spray system 208 includes at least two spray manifolds made of piping that are formed to spray the water 209 onto a filter tray rack 210.

In this aspect, the manifolds (of the spray system 208) are positioned above the filter tray rack 210 to spray (or drip or otherwise expel) the water 209 onto the filter tray rack 210. In order to provide an actual spray, the spray system 208 can be formed to include a plurality of spray nozzles along the length of the manifolds. Alternatively, simple holes can be formed in the manifolds with the holes directed downward such that water traveling into the piping of the manifolds is forced through the holes and towards the filter tray rack 210.

The filter tray rack 210 is positioned above the first recovery chamber 204 and is formed to filter the water 209 as it falls through the filter tray rack 210 and into the first recovery chamber 204 as filtered water 211. In other words, the filter tray rack 210 operates as a gravity-fed filtration system that filters the contaminated water 209 before being introduced into the first recovery chamber 204. As can be appreciated by one skilled in the art, the clarifier 100 according to the present invention can be formed without the filter tray rack 210 such that the water 209 is disposed directly into the first recovery chamber 204. However, it is desirable to include the filter tray rack 210 to provide an initial level of filtration and generate the filtered water 211.

Further, it should be noted that the filter tray rack 210 is a removable rack such that removal of the rack exposes the first recovery chamber 204 for access by a user to service the chamber 204. As a non-limiting example, the filter tray rack 210 can be formed to simply rest on top of the first recovery chamber 204 (via rails, tabs, etc.), allowing for easy removal and access to the first recovery chamber 204.

Figure 3:
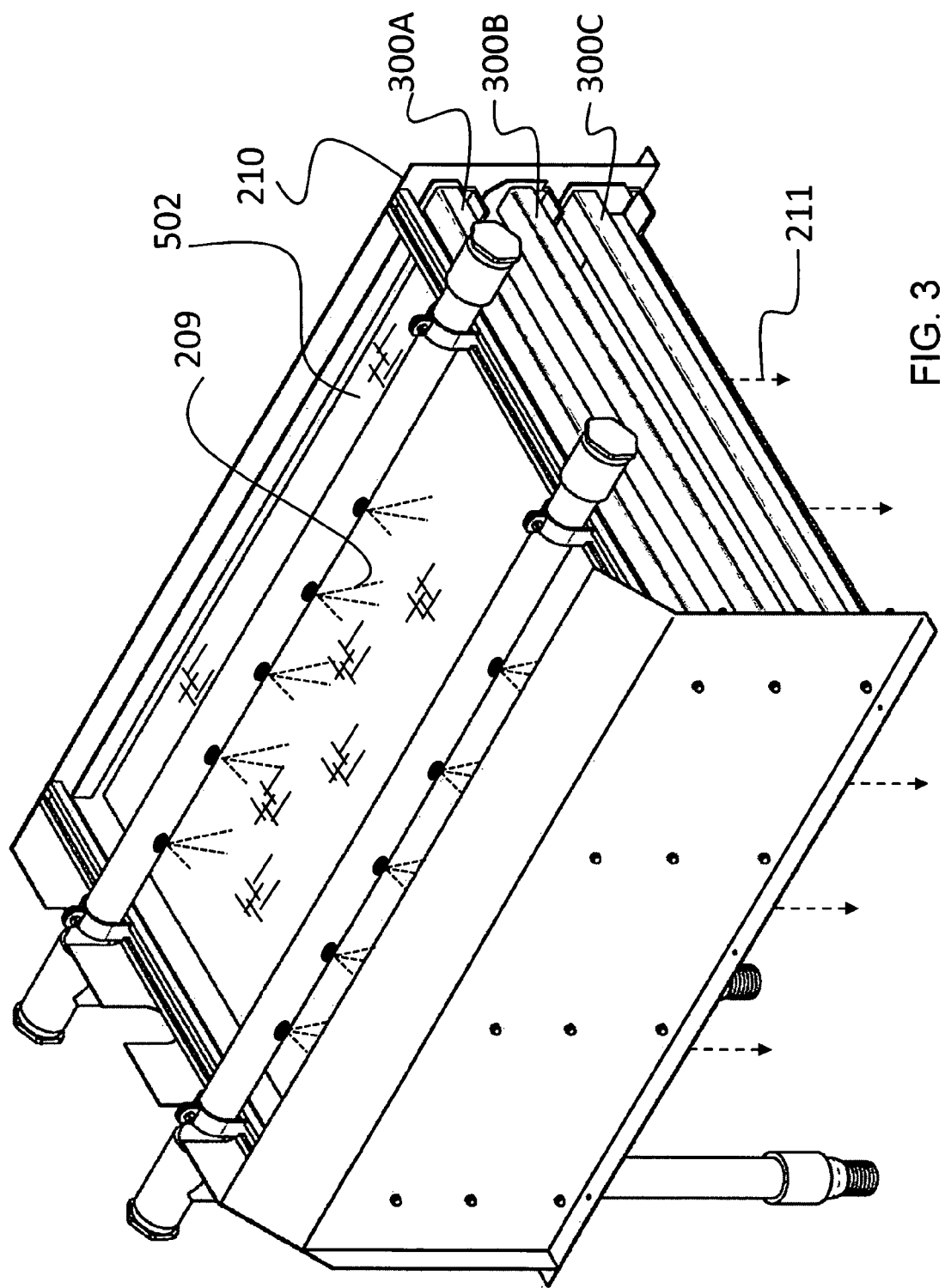
FIG. 3 is a top, perspective-view illustration of a filter tray rack according to the present invention.

The filter tray rack 210 is any suitable mechanism or device that is operable for providing an initial level of gravity fed filtration to generate the filtered water 211. As a non-limiting example and as shown in FIGS. 3 and 4, the filter tray rack 210 includes a plurality of removable filter trays 300A, 300B, and 300C, each subsequent filter tray disposed directly beneath a preceding filter tray such that water drips through a series of filter trays for progressively further filtering.

Figure 4:
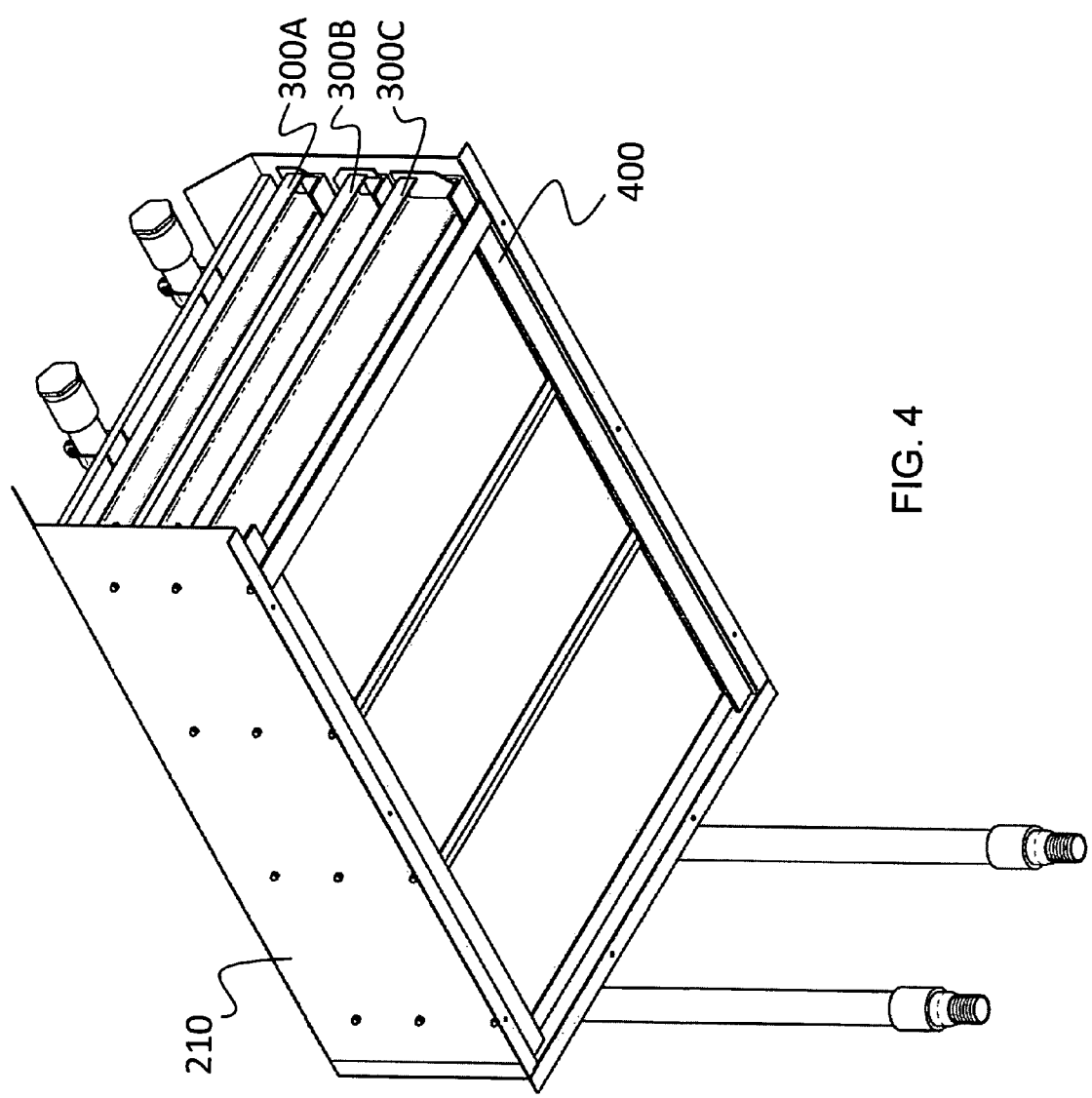
FIG. 4 is a bottom, perspective-view illustration of the filter tray rack according to the present invention.

FIG. 4 is a bottom, perspective-view illustration of the filter tray rack 210, showing that each of the removable filter trays 300A, 300B, and 300C are supported by a tray support rail system 400 that allows each of the removable filter trays 300A, 300B, and 300C to be selectively removed by a user for cleaning. For example, the support rail system 400 is simply a rail or other support member for supporting a filter tray thereon.

Figure 5:
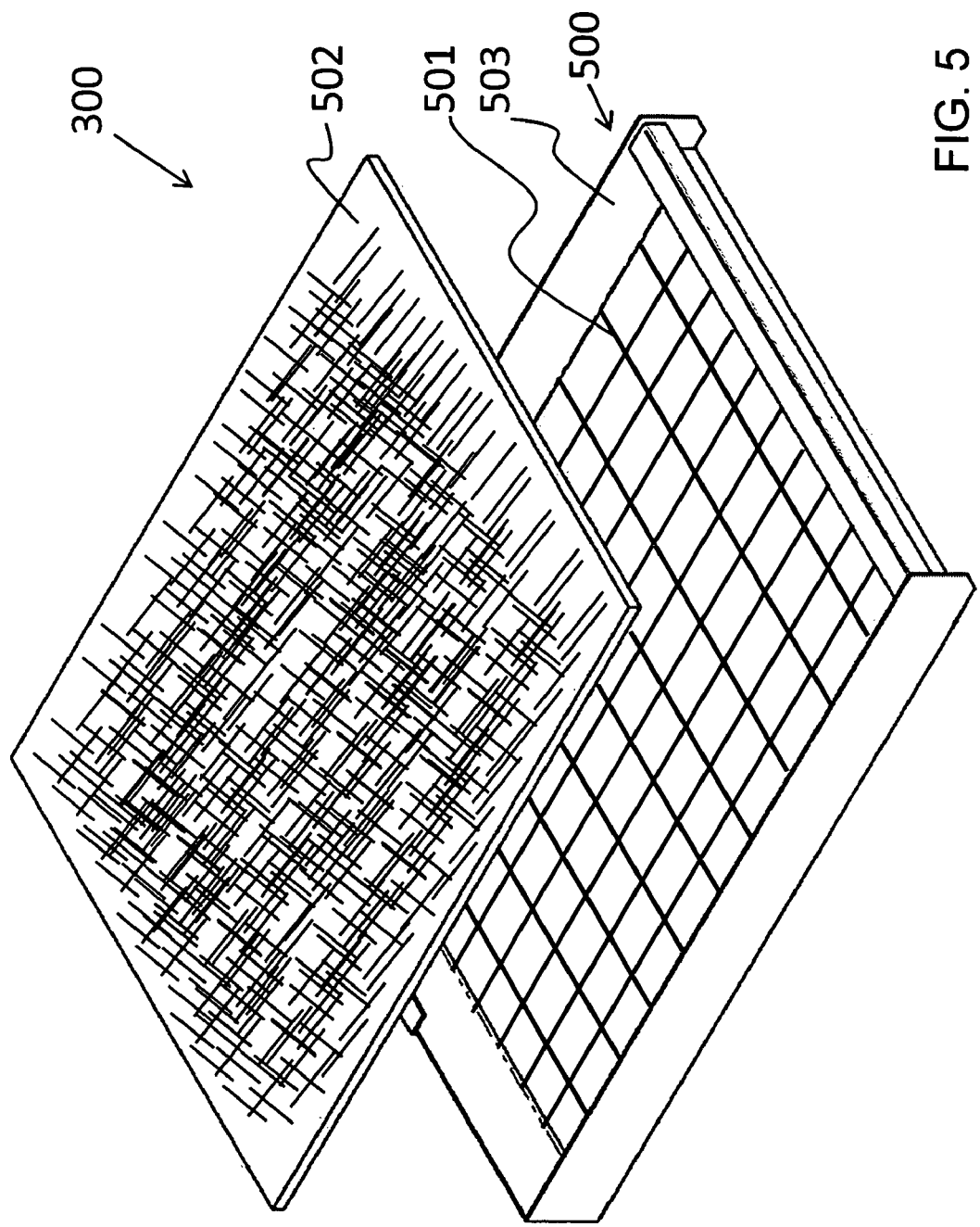
FIG. 5 is a perspective-view illustration of a filter tray, depicting a support and corresponding filter.

As shown in FIG. 5, each filter tray 300 includes a support 500 and filter 502. The support 500 is any suitable mechanism or device that is operable for engaging with the support rail system (i.e., element 400 in FIG. 4) and supporting the filter 502, while still allowing water to pass therethrough. As a non-limiting example, the support 500 is a perforated mesh support 501 with surrounding frame 503 attached thereto.

Regarding the filter 502, the filter is any suitable filter that is operable for filtering out solids from a fluid, a non-limiting example of which includes a substantially planar, porous, and removable foam filter. Thus, each filter tray 300 includes a removable foam filter that can be easily removed from the filter tray 300 (and filter tray rack) for easy cleaning.

To progressively increase the filtering capacity of the filter tray rack, each of the foam filters 502 can be optionally formed of a distinct texture from one another to filter out solids of different sizes. As a non-limiting example and referring again to FIG. 3, the foam filter 502 in filter tray 300A could be a foam filter with relatively large passage holes to capture large solids yet allow smaller particulates to pass therethrough. Next, the filter in the subsequent filter tray 300B could be a foam filter with relatively smaller holes than that of the preceding filter (i.e., the filter in tray 300A) to capture smaller particles that passed through the preceding filter. Finally, the last filter tray 300C could be a foam filter with yet even small holes than that of the preceding filter (i.e., the filter in tray 300B) to capture yet even smaller particles. Thus, by decreasing the passage holes in the series of filters, the filter tray rack 210 is able to progressively filter the contaminated water 209 to produce the filtered water 211.

To allow a user to easily clean the filters and referring again to FIG. 1, the clarifier 100 also includes a removable filter cleaning tray 108. The removable filter cleaning tray 108 is formed to accommodate a filter tray (i.e., element 300 of FIG. 5) to allow a user to position and clean the filter tray thereon. Thus, the filter cleaning tray 108 is of a size relatively larger than a filter tray to allow the filter tray to be held and encompassed by the filter cleaning tray 108.

Figure 6:
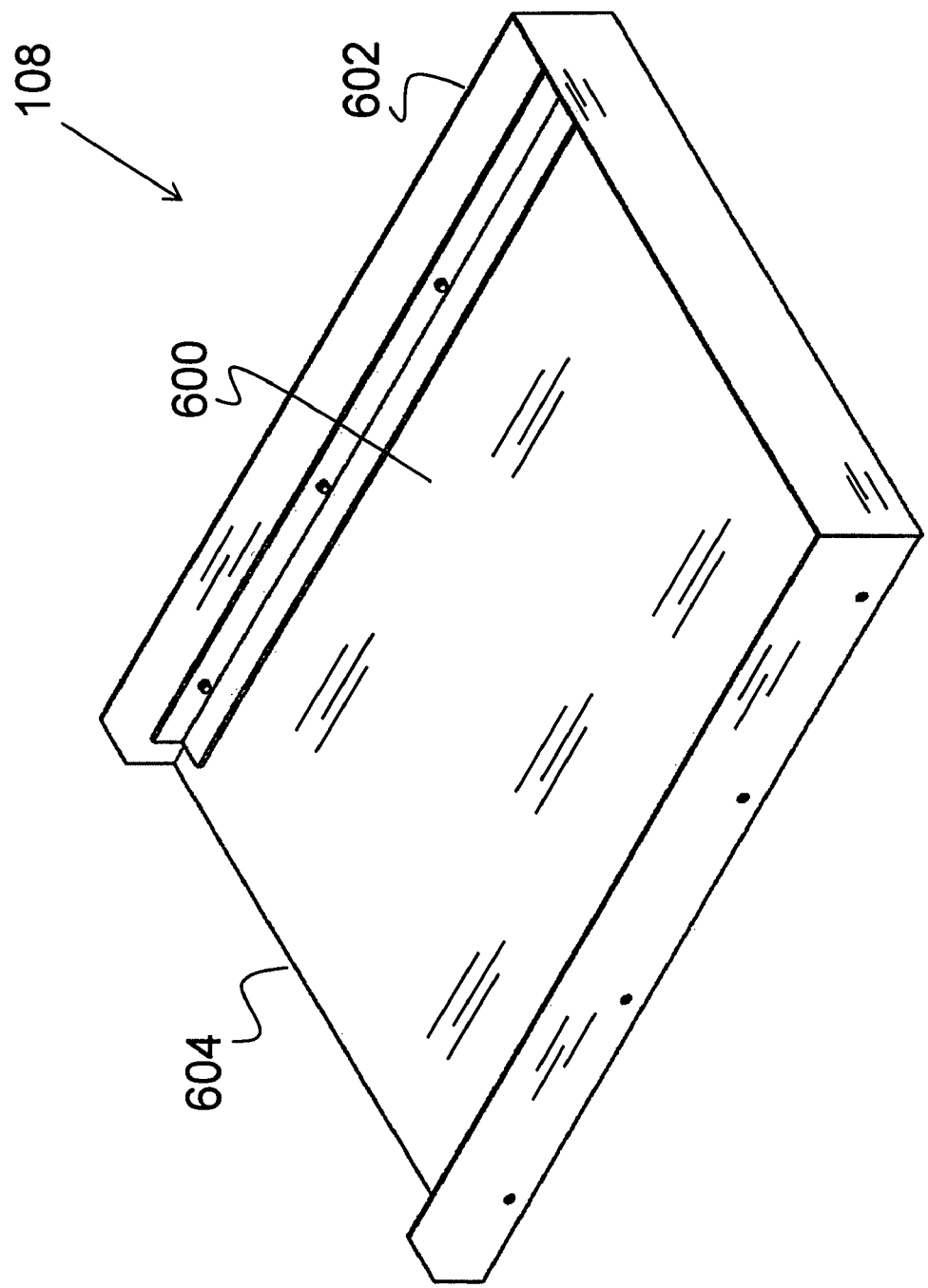
FIG. 6 is a perspective-view illustration of a cleaning filter tray according to the present invention.

As shown in FIG. 6, the filter cleaning tray 108 can be formed as a tray-type device with a substantially planar bottom 600 and surrounding side walls 602. Additionally, an open end 604 or other drain type formation (e.g., hole) can be included to allow water to drain therefrom. Importantly and as shown between FIGS. 1 and 2, the removable filter cleaning tray 108 is positioned above the second recovery chamber 206 at an angle 110 such that water draining from the filter cleaning tray 108 falls into the second recovery chamber 206 (either directly or via a trap 212 as described below).

Referring again to FIG. 2, a trap 212 can be formed at the top portion of the second recovery chamber 206 such that water draining from the filter cleaning tray 108 falls first into the trap 212 (where particulates can be trapped) and thereafter into the second recovery chamber 206. The trap 212 acts as a trough to capture particulates yet allow water to spill over into the second recovery chamber 206. Further, access to the fourth inlet 226 can be positioned within the trough or trap 212 such that overflow from the second chamber 206 spills into the trap 212 and out the drain system 106. As can be appreciated by one skilled in the art, such an overflow inlet (i.e., the fourth inlet 226) can be positioned anywhere within the recovery chamber; however, its inclusion in the trap 212 provides yet another level of filtration.

Additionally, the filter cleaning tray 108 is attached with the clarifier 100 such that removal of the filter cleaning tray 108 exposes both the second recovery chamber 206 and the sump chamber 202, thereby providing ease of access to the chambers for service, cleaning, and maintenance.

As mentioned above and as further depicted in the internal-view illustration of FIG. 7, the clarifier 100 includes a first recovery chamber 204 positioned below the filter tray rack 210. Additionally, the second recovery chamber 206 is formed adjacent to the first recovery chamber 204, although separated from one another via a baffle 700 or other barrier. Finally, the sump chamber 202 is formed adjacent to the second recovery chamber 206 (again separated by a baffle 702 or other barrier).

Figure 7:
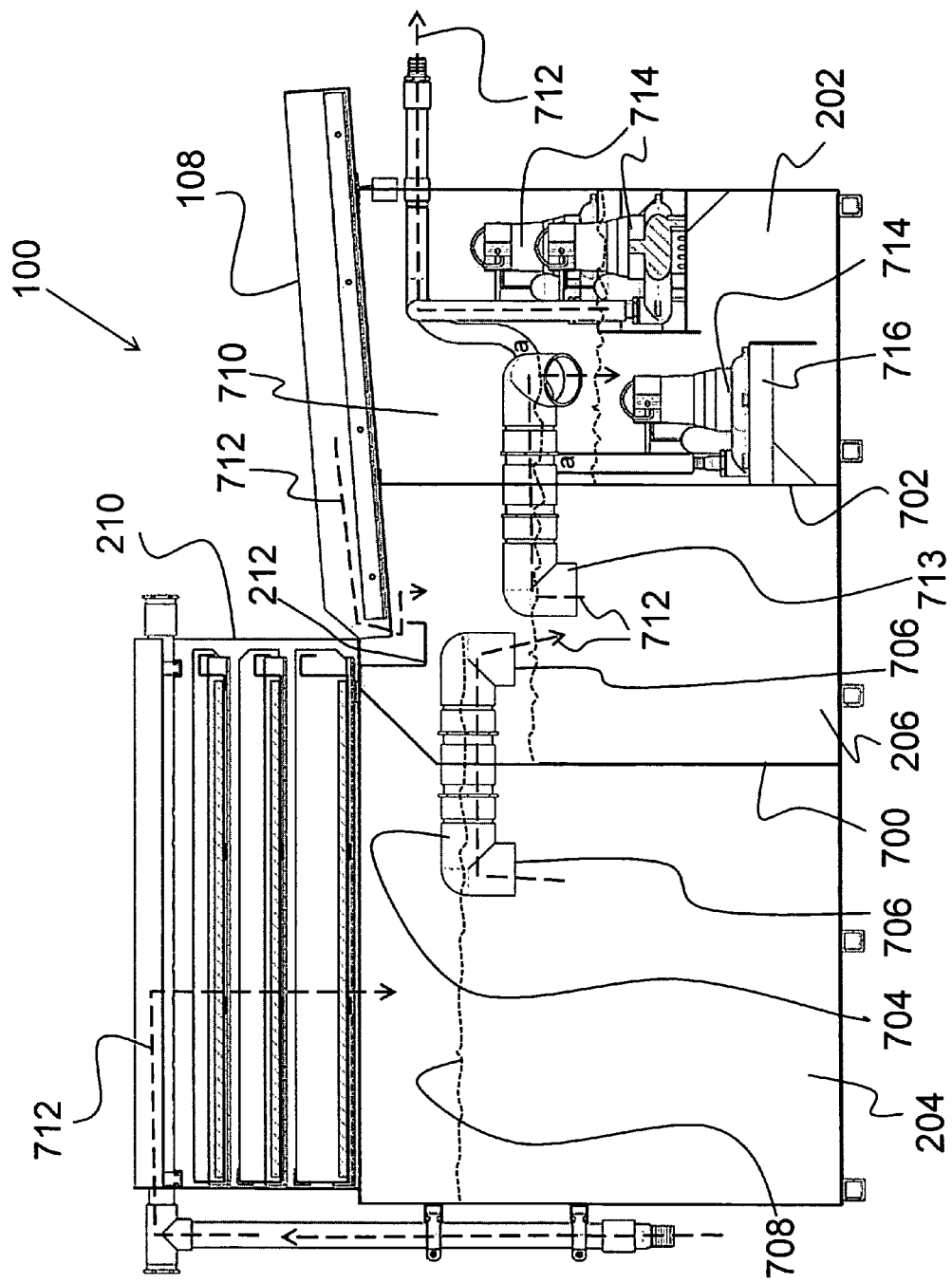
FIG. 7 is a side, internal-view illustration of the clarifier according to the present invention.

As clearly depicted in FIG. 7, the first recovery chamber 204 is fluidly connected with the second recovery chamber 206. Such a fluid connection can be made using any number of suitable techniques. As a non-limiting example, the baffle 700 can have openings formed therethrough to allow for fluid flow between the two chambers. As yet another non-limiting example, the baffle 700 can be formed to separate only a portion of the two chambers and thereby allow for the free flow of fluids between the un-separated portions of the chambers. Finally, a first inverted conduit 704 can be positioned through the baffle 700 such that it fluidly connects the first 204 and second 206 recovery chambers. Thus, the first inverted conduit 704 (e.g., piping) includes inlets 706 that project downward and below a water surface level 708 in each of the first 204 and second 206 recovery chambers. Thus, due to the downward projection of the inlets 706, the water is able to pass from the first recovery chamber 204 to the second recovery chamber 206 while minimizing the passage of oils therebetween.

Similarly, the second recovery chamber 206 is in fluid connection with the sump chamber 202 using a suitable technique, such as via a second inverted conduit 713. As shown, the second inverted conduit 713 can be positioned at an elevation that is lower than the first inverted conduit 704. This provides a slight stepping down as water flows from the first recovery chamber 204, into the second recovery chamber 206, and finally into the sump chamber 202. This prevents water from backflowing from the sump chamber 202 or second recovery chamber 206 back into the first recovery chamber 204. The illustration of the second inverted conduit 713 obscures the piping from the sump pump 714. As such, numerals "a" are positioned in the illustration to depict a continuation of the piping from the sump pump 714.

Also depicted in FIG. 7 is the trap 212 and water flow 712, which illustrates how the water draining from the filter cleaning tray 108 can drain into the trap 212, the second recovery chamber 206, and ultimately the sump chamber 202. The water flow 712 is also shown as filtering through the filter tray rack 210 and traveling between the chambers (via the conduits 704 and 710) until reaching the sump chamber 202.

The sump chamber 202 includes a plurality of sump pumps 714 positioned therein. As clearly understood by one skilled in the art, the sump pump 714 is any suitable pumping mechanism or device for pumping water from one place to another. Each sump pump 714 is placed on a tiered stand 716 at a different elevation within the sump chamber 202 for pumping the water from the sump chamber to a reclaim holding tank or other system.

The sump pumps 714 are positioned at different elevations to conserve energy. For example, if the water level within the sump chamber 202 reaches only the first sump pump 714, then only the first sump pump is activated to begin pumping the water. If the volume in the sump chamber 202 is such that it reaches both the first sump pump and a second sump pump at a higher elevation, then both sump pumps 714 are activated to begin pumping out the water. This process can be applied to each of the sump pumps 714 as the different elevations. Alternatively, as the water is pumped from the sump chamber 202, the sump pumps 714 progressively turn off when they are no longer exposed to the water (i.e., the water volume has dropped below the level of the corresponding pump). Thus, by only turning on those sump pumps 714 that are below the water level, the system is able to conserve energy by using smaller sump pumps 714 and only those sump pumps 714 that are needed at the particular moment.

The sump chamber 202 and/or the first recover chamber 204 and/or the second recovery chamber 206 can optionally include an oil-absorbing material to further remove any oil that may have traveled into the chambers, a non-limiting example of such an oil-absorbing material includes a sorbent, such as a pillow sorbent. The sorbent floats on the water to absorb any oil that is concurrently floating on the water in the respective chamber. Oil only sorbents absorb petroleum based products, but are hydrophobic (repel water). Thus, oil sorbents effectively soak up oily spills (such as the oil floating on the water in the clarifier oil trapping chambers (i.e., the sump chamber 202 and the first 204 and second 206 recovery chambers)). In another aspect, an oil skimmer can be included in any of the chambers to further remove floating oil from the water within that chamber. Desirably, the oil-absorbing material and oil skimmer are positioned within the second recover chamber 206.

Figure 8:
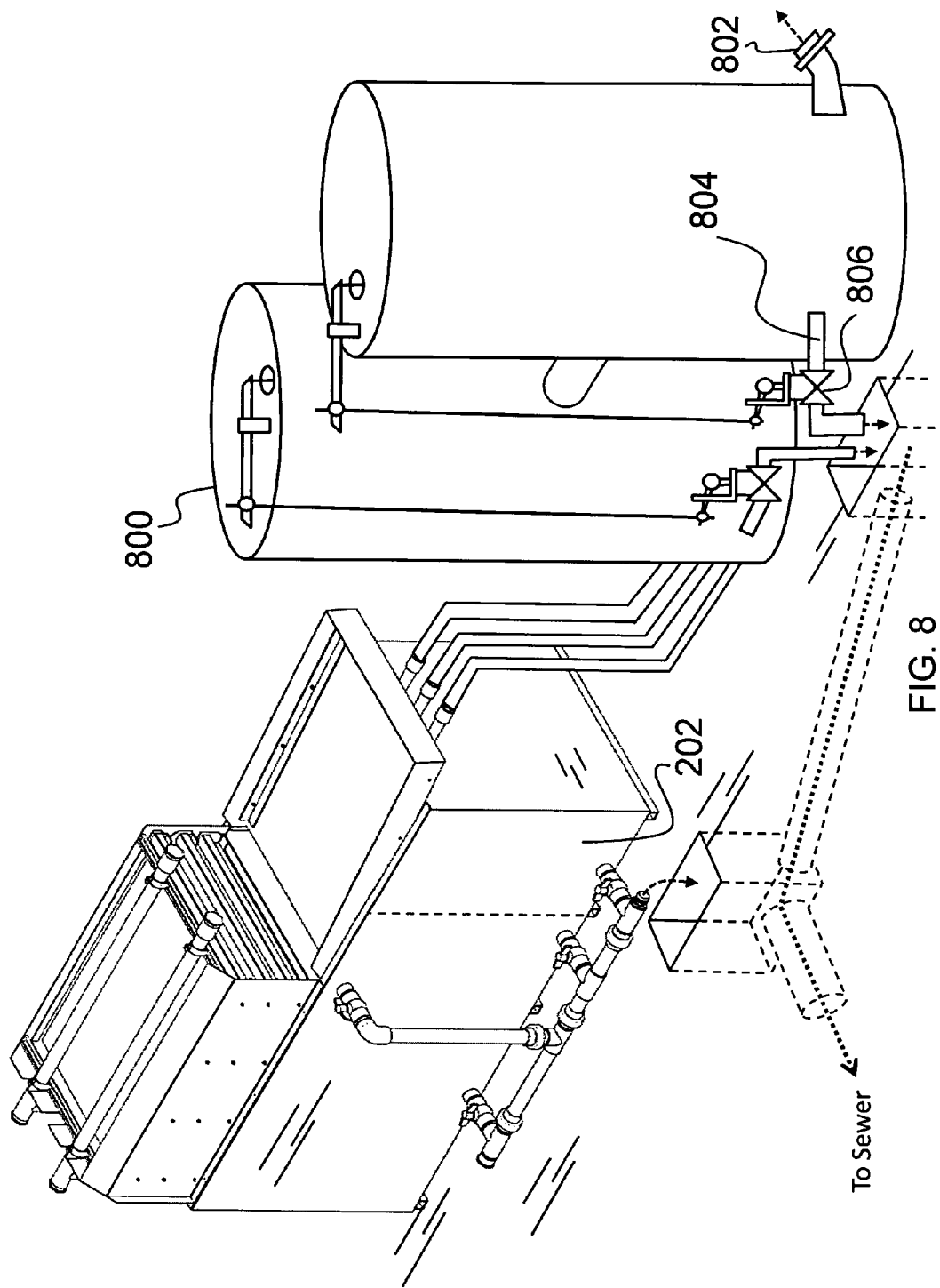
FIG. 8 is a perspective-view illustration of the clarifier and holding tanks according to the present invention.

As mentioned above, the sump pumps 714 can be used to pump the water to a reclaim holding tank. Thus, as shown in FIG. 8, the present invention also includes an above-ground water reclaim holding tank 800 (or series of holding tanks connected via piping) for receiving the water from the sump chamber 202. The water can then be stored in the above-ground water reclaim holding tanks 800 for further reuse in the external system (e.g., vehicle washing system). As such, the holding tanks 800 include a return system 802 (e.g., conduits and valves) to return the reclaimed and clarified water to the external system. A tank overflow system 804 is also included to prevent the tanks 800 from becoming excessively full. As a non-limiting example, the tank overflow system 804 includes a pipe connected at a top portion of at least one of the tanks 800 such that water reaching the pipe flows into the pipe from the tank 800 and to the sewer.

As another non-limiting example, instead of overflow from the top of tanks 800, the tank overflow system 804 can be formed such that overflow will drain out from the bottom of the tanks 800 thru a mechanical lever-operated float valve 806 (or an electronic solenoid valve) positioned near the bottom of the tanks 800. This in turn will drain heavier, dirt concentrated water from the bottom of the tanks 800 first instead of the less dirty water from the top of the tanks 800.

Figure 9:
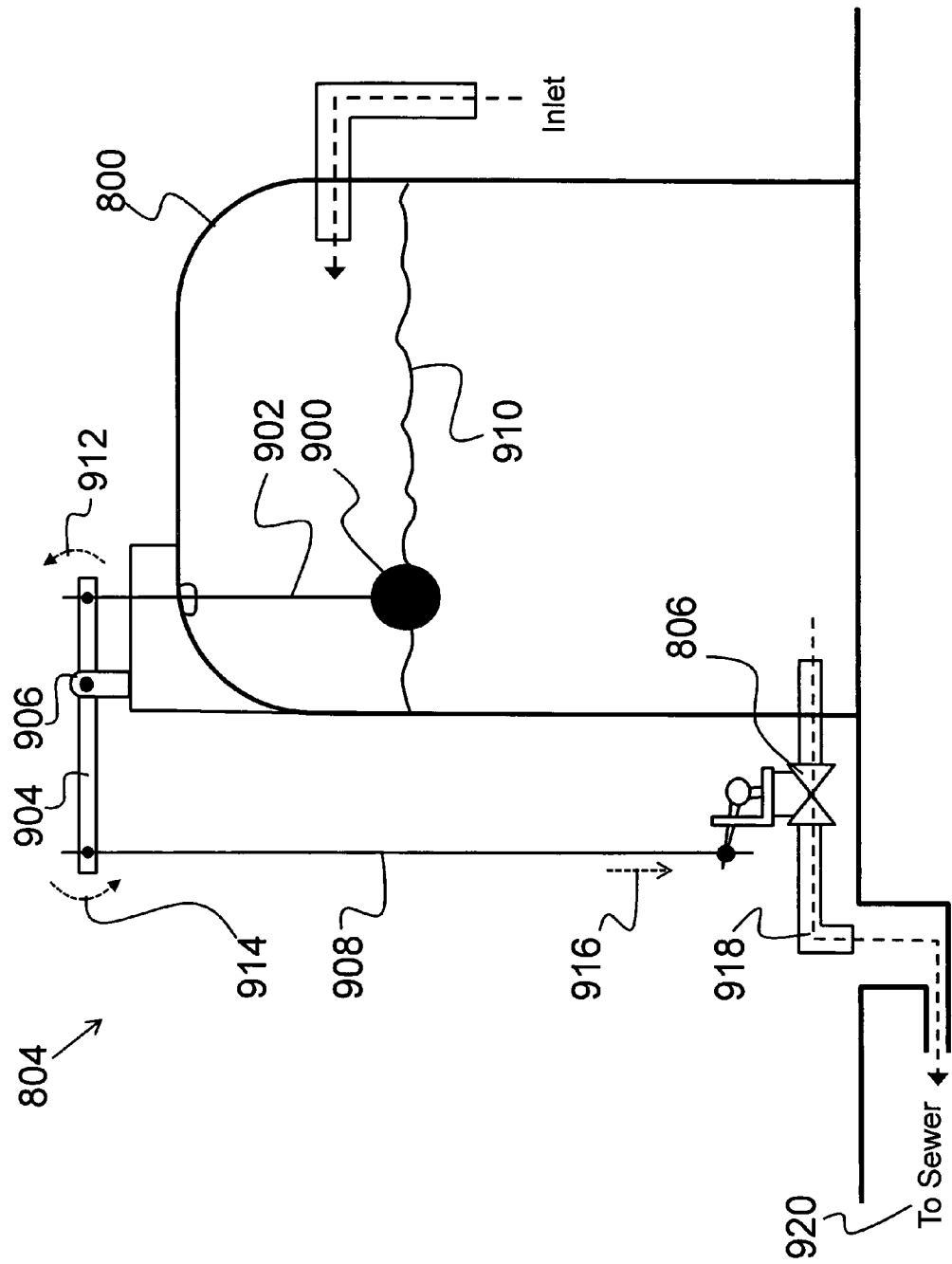
FIG. 9 is an internal-view illustration of a tank according to the present invention, depicting a tank overflow system.

For further understanding of the tank overflow system, FIG. 9 illustrates an internal view of a tank 800 and the corresponding tank overflow system 804. The tank overflow system 804 is any suitable valve system that allows for the tank 800 to drain upon the water level reaching a certain level. For example and as noted above, the tank overflow system 804 includes a lever-operated float valve 806. Also included is a float 900 positioned within the tank 800. The float 900 is formed to be buoyant in water or other fluids. As a non-limiting example, the float 900 is formed of Styrofoam or a sealed hollow plastic ball. The float 900 is connected with a float rod 902 that in turn is pivotally connected with a lever arm 904. The lever arm 904 is pivotally connected with the tank 800 via a lever fulcrum member 906. An outer end of the lever arm 904 is connected with a connecting rod 908, which in turn is connected with the lever-operated float valve 806.

In operation, as the water level 910 in the tank 800 rises, it lifts the float 900 which forces the lever arm 904 up 912 on one end and down 914 on the other. As the other end of the lever arm 904 is forced downward 914, it pushes the connecting rod 908 down 916, which in turn opens the lever-operated float valve 806. For example, the lever-operated float valve 806 can include a valve seal that is lifted from the valve seat when the connecting rod 908 is pushed downward 916, thereby opening the drain 918 of the tank and allowing the dirtiest water at the bottom of the tank 800 to drain first and flow to the sewer 920.

Thus, the clarifier described herein provides an above ground clarifier that is easily serviceable as it is not encased in concrete or soil and includes a plurality of easily accessible chambers. Further, the clarifier is energy efficient in that it uses a series of gravity fed filters to initially filter contaminated water before storing the water in above ground holding tanks. Thereafter, the water can be gravity fed to the sewer or returned to the external system from which is was initially received.

What is claimed is:

1. An above ground water clarifier for filtering out solids and/or oil from water before release to a sewer system, the above ground water clarifier comprising:

an above ground tank with a plurality of distinct chambers for receiving water having measurable amounts of solids and/or oils, each chamber having a top portion and a bottom portion and being fluidly connected with at least one other chamber via a conduit positioned between the top and bottom portions, with the chambers formed to settle solids at the bottom portions and oil at the top portions and thereby remove solids and/or oils from fluids passing between the chambers via the conduit a drain system connected with the chambers to allow a user to selectively feed water from at least one of the chambers to a sewer or other tank;

wherein the plurality of distinct chambers includes a recovery chamber and a sump chamber, and wherein the above ground water clarifier further comprises:

a spray system for receiving water from an external system and disposing the water onto a filter tray rack;

a filter tray rack for filtering the water as it falls through the filter tray rack;

wherein the recovery chamber is positioned below the filter tray rack for receiving and collecting the water filtered by the filter tray rack; and wherein the sump chamber is in fluid connection with the recovery chamber for receiving water from the recovery chamber and pumping the water to an above ground reclaim holding tank;

wherein the drain system is a gravity fed drain system connected with the chambers to allow a user to selectively gravity feed water from at least one of the chambers to a sewer or other tank;

wherein the filter tray rack includes a plurality of removable filter trays, each subsequent filter tray disposed directly beneath a preceding filter tray such that water dripping through the preceding filter tray drips into the subsequent filter tray for further filtering;

wherein each filter tray includes a perforated mesh support and a removable foam filter supported thereon, the removable foam filter being operable for filtering out solids from the water;

wherein each foam filter is of a distinct texture from one another to filter out solids of different sizes;

wherein the spray system further includes at least two spray manifolds positioned above the filter trays and formed to spray the water onto the filter trays; and a plurality of sump pumps positioned within the sump chamber, each sump pump being placed on a tiered stand at a different elevation within the sump chamber for pumping the water from the sump chamber to the reclaim holding tank.

2. The system as set forth in claim 1, wherein the recovery chamber further comprises a first recovery chamber disposed directly beneath the filter tray rack for separating solids and/or oil from the water and a second recovery chamber separated from the first recovery chamber by a baffle and disposed adjacent to the first recovery chamber.

3. The system as set forth in claim 2, wherein the first recovery chamber is fluidly connected with the second recovery chamber via an inverted conduit having inlets that project downward and below a water surface level, thereby allowing water to pass between the first and second recovery chambers while minimizing the passage of oils therebetween.

4. The system as set forth in claim 3, further comprising a removable filter cleaning tray positioned above the second recovery chamber at an angle such that water draining from the filter cleaning tray falls into the second recovery chamber.

5. The system as set forth in claim 4, wherein the removable filter cleaning tray is formed to accommodate a filter tray to allow a user to position and clean a filter tray thereon.

6. The system as set forth in claim 5, wherein the removable filter cleaning tray is attached with the water clarifier such that removal of the removable filter cleaning tray exposes both the second recovery chamber and the sump chamber.

7. The system as set forth in claim 6, wherein the second recovery chamber is in fluid connection with the sump chamber via an inverted conduit.

8. The system as set forth in claim 7, wherein the drain system includes at least four inlets, a first inlet from a bottom portion of the first recovery chamber, a second inlet from a bottom portion of the second recovery chamber, a third inlet from a bottom portion of the sump chamber, and a fourth inlet from a top portion of the second recovery chamber to operate as an overflow drain that will allow excess water to gravity feed to a sewer or other tank.

9. The system as set forth in claim 8, further comprising an oil absorbing material dispersed in at least one chamber selected from a group consisting of the sump chamber, the first recovery chamber, and the second recovery chamber to further remove any oil that may have travelled into the selected chamber.

10. The system as set forth in claim 9, further comprising an above ground water reclaim holding tank for receiving the water from the sump chamber.

11. An above round water clarifier for filterin out solids and/or oil from water before release to a sewer system, the above ground water clarifier comprising:

an above ground tank with a plurality of distinct chambers for receiving water having measurable amounts of solids and/or oils, each chamber having a top portion and a bottom portion and being fluidly connected with at least one other chamber via a conduit positioned between the top and bottom portions, with the chambers formed to settle solids at the bottom portions and oil at the top portions and thereby remove solids and/or oils from fluids passing between the chambers via the conduit;

a drain system connected with the chambers to allow a user to selectively feed water from at least one of the chambers to a sewer or other tank;

wherein the plurality of distinct chambers includes a recovery chamber and a sump chamber, and wherein the above ground water clarifier further comprises:

a spray system for receiving water from an external system and disposing the water onto a filter tray rack;

a filter tray rack for filtering the water as it falls through the filter tray rack;

wherein the recovery chamber is positioned below the filter tray rack for receiving and collecting the water filtered by the filter tray rack;

wherein the sump chamber is in fluid connection with the recovery chamber for receiving water from the recovery chamber and pumping the water to an above ground reclaim holding tank; and a plurality of sump pumps positioned within the sump chamber, each sump pump being placed on a tiered stand at a different elevation within the sump chamber for pumping the water from the sump chamber.

12. An above ground water clarifier for filtering out solids and/or oil from water before release to a sewer system, the above ground water clarifier comprising:

an above ground tank with a plurality of distinct chambers for receiving water having measurable amounts of solids and/or oils, each chamber having a top portion and a bottom portion and being fluidly connected with at least one other chamber via a conduit positioned between the top and bottom portions, with the chambers formed to settle solids at the bottom portions and oil at the top portions and thereby remove solids and/or oils from fluids passing between the chambers via the conduit;

a drain system connected with the chambers to allow a user to selectively feed water from at least one of the chambers to a sewer or other tank;

wherein the plurality of distinct chambers includes a recovery chamber and a sump chamber, and wherein the above ground water clarifier further comprises:

a spray system for receiving water from an external system and disposing the water onto a filter tray rack;

a filter tray rack for filtering the water as it falls through the filter tray rack;

wherein the recovery chamber is positioned below the filter tray rack for receiving and collecting the water filtered by the filter tray rack;

wherein the sump chamber is in fluid connection with the recovery chamber for receiving water from the recovery chamber and pumping the water to an above ground reclaim holding tank;

wherein the recovery chamber further comprises a first recovery chamber disposed directly beneath the filter tray rack for separating solids and/or oil from the water and a second recovery chamber separated from the first recovery chamber by a baffle and disposed adjacent to the first recovery chamber; and a removable filter cleaning tray positioned above the second recovery chamber at an angle such that water draining from the filter cleaning tray falls into the second recovery chamber.

13. The system as set forth in claim 12, wherein the removable filter cleaning tray is attached with the water clarifier such that removal of the removable filter cleaning tray exposes both the second recovery chamber and the sump chamber.

14. An above ground water clarifier for filtering out solids and/or oil from water before release to a sewer system, the above ground water clarifier comprising:

an above ground tank with a plurality of distinct chambers for receiving water having measurable amounts of solids and/or oils, each chamber having a top portion and a bottom portion and being fluidly connected with at least one other chamber via a conduit positioned between the top and bottom portions, with the chambers formed to settle solids at the bottom portions and oil at the top portions and thereby remove solids and/or oils from fluids passing between the chambers via the conduit;

a drain system connected with the chambers to allow a user to selectively feed water from at least one of the chambers to a sewer or other tank;

wherein the plurality of distinct chambers includes a recovery chamber and a sump chamber, and wherein the above ground water clarifier further comprises:

a spray system for receiving water from an external system and disposing the water onto a filter tray rack;

a filter tray rack for filtering the water as it falls through the filter tray rack;

wherein the recovery chamber is positioned below the filter tray rack for receiving and collecting the water filtered by the filter tray rack;

wherein the sump chamber is in fluid connection with the recovery chamber for receiving water from the recovery chamber and pumping the water to an above ground reclaim holding tank;

wherein the recovery chamber further comprises a first recovery chamber disposed directly beneath the filter tray rack for separating solids and/or oil from the water and a second recovery chamber separated from the first recovery chamber by a baffle and disposed adjacent to the first recovery chamber; and wherein the drain system includes at least four inlets, a first inlet from a bottom portion of the first recovery chamber, a second inlet from a bottom portion of the second recovery chamber, a third inlet from a bottom portion of the sump chamber, and a fourth inlet from a top portion of the second recovery chamber to operate as an overflow drain that will allow excess water to feed to a sewer or other tank.

* * * * *